Feb. 7, 1956 J. P. LA RUE 2,733,685
CATTLE SQUEEZE CHUTE
Filed Feb. 6, 1953 2 Sheets-Sheet 1
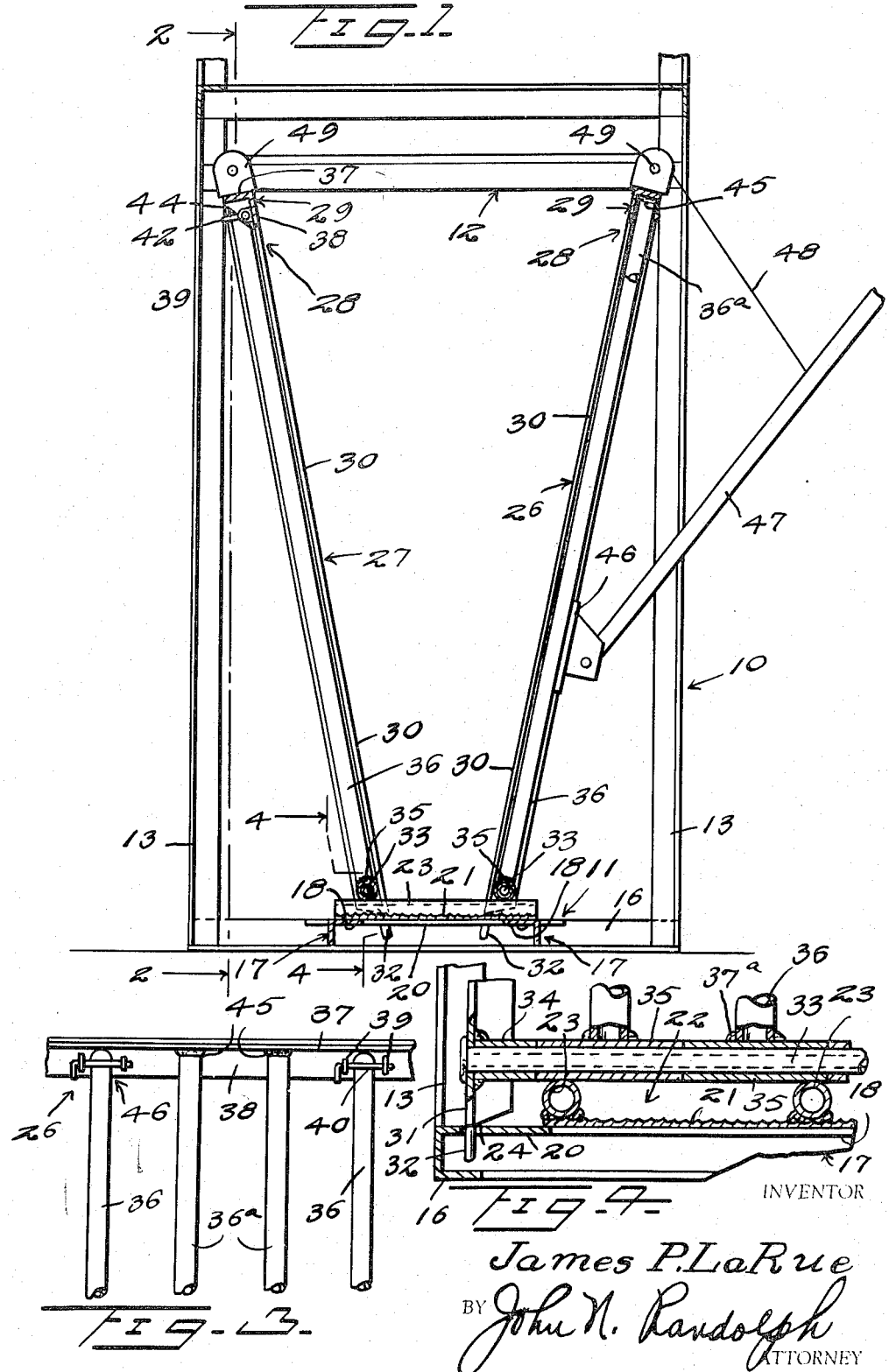
INVENTOR
James P. LaRue
BY John N. Randolph
ATTORNEY

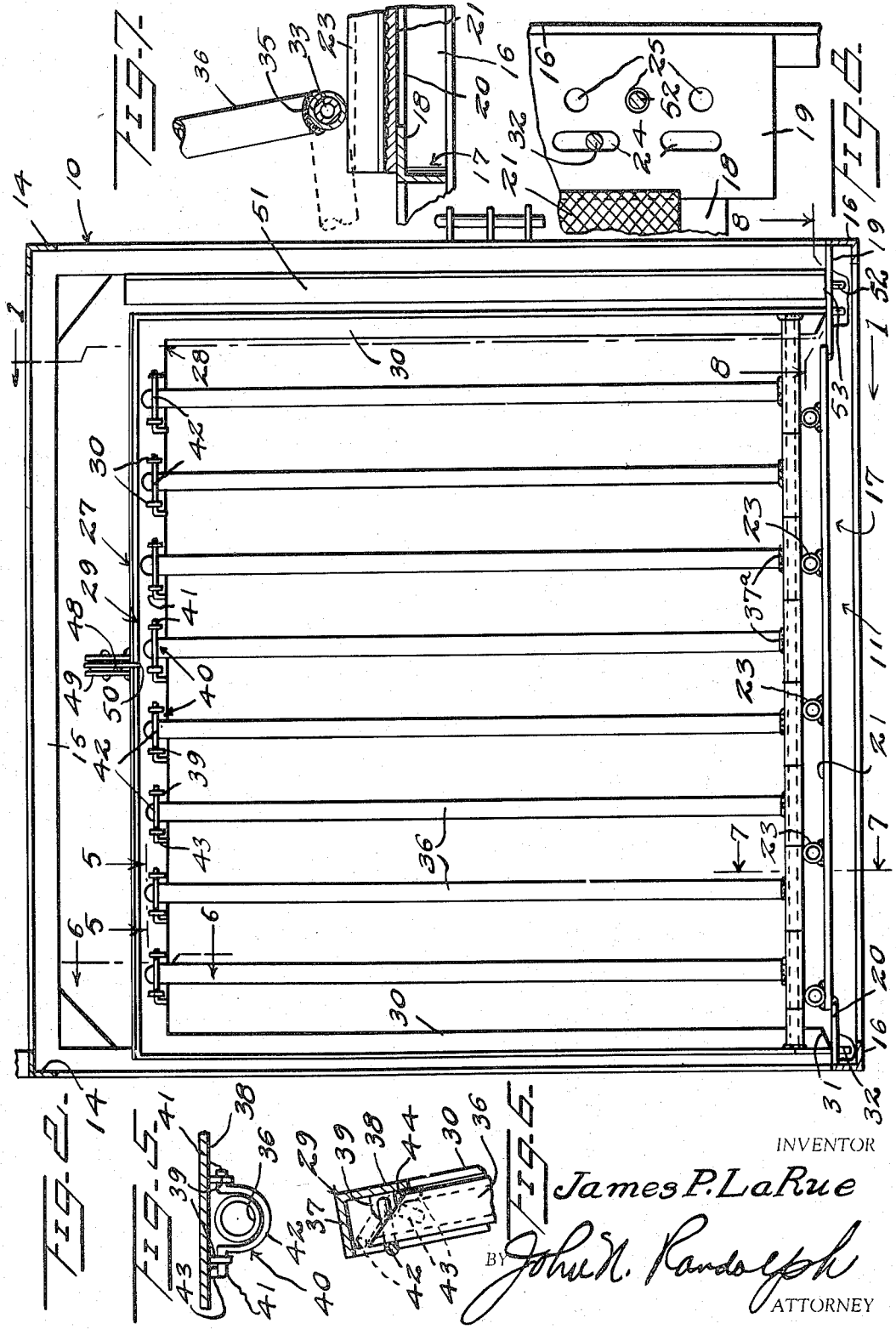

United States Patent Office 2,733,685
Patented Feb. 7, 1956

2,733,685

CATTLE SQUEEZE CHUTE

James P. La Rue, Parks, Ariz.

Application February 6, 1953, Serial No. 335,496

3 Claims. (Cl. 119—98)

This invention relates to an improved cattle squeeze chute for catching and holding cattle for branding, vaccinating, castrating, dehorning, doctoring and many other operations which require confinement of an animal.

More particularly, it is a primary object of the present invention to provide a novel construction of cattle chute sides between which the animal is tightly held while in the chute and which includes drop bars capable of being individually swung outwardly and downwardly to open positions to expose portions of either side of the chute to afford adequate space to conveniently work on any part of an animal held in the chute.

Still a further object of the invention is to provide side drop bars extending from top to bottom on the sides of the chute, all of which may be opened on one side of the chute, if necessary, for removing an animal which has fainted or collapsed, through the thus opened side of the chute.

Still another object of the invention is to provide a cattle chute having squeeze sides capable of being readily adjusted laterally for varying the spacing therebetween to efficiently accommodate animals of different sizes including full grown cattle and small calves.

Other objects and advantages of the invention will hereinafter become more fully apparent from the following description of the drawings, illustrating a presently preferred embodiment thereof, and wherein:

Figure 1 is a cross sectional view taken substantially along a plane as indicated by the line 1—1 of Figure 2 and illustrating the novel cattle chute sides;

Figure 2 is a longitudinal sectional view, partly in side elevation, taken substantially along a plane as indicated by the line 2—2 of Figure 1;

Figure 3 is a fragmentary side elevational view of a portion of the upper part of one of the squeeze sides;

Figure 4 is an enlarged fragmentary longitudinal sectional view taken substantially along a plane as indicated by the line 4—4 of Figure 1;

Figure 5 is an enlarged horizontal sectional view taken substantially along a plane as indicated by the line 5—5 of Figure 2;

Figure 6 is an enlarged vertical sectional view taken substantially along a plane as indicated by the line 6—6 of Figure 2;

Figure 7 is an enlarged fragmentary vertical sectional view taken substantially along a plane as indicated by the line 7—7 of Figure 2, and Figure 8 is an enlarged fragmentary horizontal sectional view taken substantially along a plane as indicated by the line 8—8 of Figure 2.

Referring more specifically to the drawings, the improved cattle squeeze chute as illustrated in Figures 1 and 2 is designated generally 10; however, a portion of the structure thereof constituting no part of the present invention has been omitted. As illustrated, the cattle squeeze chute 10 includes a base frame, designated generally 11 which supports the framework, designated generally 12. The framework 12 includes corner posts 13 which are fixed to and rise from the four corners of the base structure 11 and which corner posts are connected at or adjacent their upper ends by cross frame members 14 and longitudinal frame members 15.

The base structure 11 includes cross members 16 disposed at the ends thereof and the ends of which are secured to the lower ends of the corner posts 13. The parts 13, 14, 15 and 16 are preferably formed of angle iron. The base structure 11 also includes a pair of longitudinally extending substantially parallel angle iron members 17 which are secured at their ends to the end members 16 and which are spaced inwardly from the corner posts 13. Said angle members 17 are provided with inwardly extending horizontal top flanges 18 the end portions of which are preferably cut away to accommodate a front end plate 19 and a rear end plate 20. The end plates 19 and 20 are supported on and suitably secured to the ends of the angle members 17 and the intermediate portions of the cross members 16. A deck plate 21, having a roughened or serrated upper surface, extends between the end plates 19 and 20 and has side edge portions resting on and secured to the inwardly extending horizontal flanges 18. The parts 17, 19, 20 and 21 combine to form the floor, designated generally 22, of the cattle chute and which additionally includes a plurality of transverse and longitudinally spaced cross cleats 23 which are preferably formed of short lengths of pipe. Each end half of the front end plate 19, one-half of which is illustrated in Figure 8, is provided with two longitudinally disposed elongated slots 24 and three longitudinally spaced openings 25. The openings 25 are disposed forwardly of the slots 24. The rear plate 20 is provided with slots 24, corresponding to the slots of the front plate 19, but is not provided with the openings 25.

The cattle squeeze chute 10 includes a pair of sides 26 and 27 each of which extends nearly from end-to-end thereof. Each of the sides 26 and 27 includes a substantially arch shaped frame 28 preferably formed of angle iron having a substantially horizontal top portion 29 and depending vertical end portions 30. The lower ends of the end portions 30 are beveled, as seen at 31, for rocking engagement on the plates 19 and 20 and each of said end portions 30 has a pin or projection 32 extending downwardly from the apex of the two sides or flanges thereof. The pins or projections 32 loosely engage in either the two adjacently disposed or the two remotely disposed slots 24 of the end plates 19 and 20 for varying the spacing between the bottom portions of the sides 26 and 27. Said sides 26 and 27 are maintained in engagement with the end plates 19 and 20 solely by gravity so that the sides may be readily lifted and displaced toward or away from one another and the projections 32 then re-positioned in other of the slots 24 for varying the spacing between the sides 26 and 27 very readily and without the use of tools or the removal of fastenings, for adapting the chute 10 for animals of different sizes, such as full grown cattle or calves. Each arch frame 28 has a rigid tube or rod 33 extending longitudinally thereof and which is secured at its ends to the parallel flanges of the two end portions 30 of said frame 28, above and adjacent the lower beveled ends 31 thereof. A spacing sleeve 34 is mounted on each end of each of the tubes 33 and extends inwardly thereof to beyond the inner edge of the adjacent end portion 30. A plurality of drop bar supporting sleeves 35 are turnably disposed on each tube 33 between its spacing sleeves 34. An elongated tubular drop bar 36 has one end fixed to an intermediate portion of each sleeve 35, one of said drop bars being provided for each sleeve 35 and having an inner end secured thereto in any suitable manner as by welding, as indicated at 37a in Figure 4.

The upper portion 29 of each frame 28 includes a top wall 37 and a side wall 38, which depends from the inner edge of said top wall. The outer side of the side wall 38 of the side 27 is provided with a plurality of pairs of longitudinally spaced aligned bearings 39 which are suitably secured thereto and the bearings of each pair of which are longitudinally spaced from one another, as best illustrated in Figure 5, to accommodate the upper end of one of the drop bars 36 therebetween. Each pair of bearings 39 pivotally mounts a latch, designated generally 40, formed from a single strand of heavy gauge wire or the like having aligned trunnion portions 41 which are journalled in said bearings 39 and an intermediate yoke shaped portion 42, disposed between the trunnions 41 and extending outwardly from the bearings 39. The latch 40 also includes a stop 43 which depends from the outer end of one of the trunnions 41 at an angle to the plane of the yoke 42 and which bears against the wall 38 to support the yoke 42 substantially perpendicular to said wall and beneath and substantially parallel to the top wall 37. The upper ends of the drop bars 36 are beveled on the inner sides thereof as seen at 44 in Figure 6 and the yokes 42 are supported by the stops 43 so that as the bars 36 are swung upwardly and inwardly the beveled end portions 44 thereof will strike the yokes 42 individual thereto for swinging the yokes upwardly toward their dotted line positions of Figure 6 so the upper portions of the bars 36 may pass beneath said yokes. The yokes 42 will then swing downwardly by gravity to their full line positions of Figures 1, 2 and 6 for latching the bars 36 in raised positions, as illustrated in Figures 1 and 2. It will be obvious that the bars 36 are individually movable outwardly and downwardly to open positions as illustrated in dotted lines in Figure 7 by manually raising the latch yokes 42 individual thereto and may be individually swung upwardly and automatically latched in closed positions.

The side 26 is provided with a plurality of bars 36, corresponding to the bars 36 of the side 27, which are swingably mounted in the same manner at their lower ends by sleeves 35 and which are detachably latched at their upper ends in the same manner by latches 40. However, the two intermediate bars 36a of the side 26 are not provided with latches 40 but are permanently secured at their upper ends as by welding, as indicated at 45 in Figures 1 and 3 to the top wall 37 of the frame 28 of side 26. Said two intermediate bars 36a are rigidly mounted relatively to the frame 28 to support a mounting plate 46 which is suitably secured to the outer sides thereof and which in turn swingably supports a lever 47 to which a cable 48 is secured. The cable 48 is trained over pulleys 49 mounted on the tops of the sides 26 and 27 and is suitably anchored at 50 to the side 27, so that when the lever 47 is swung downwardly the sides 26 and 27 will be rocked toward one another about the lower beveled ends 31 thereof which fulcrum on the plates 19 and 20 for causing said sides to move toward upright positions for squeezing the body of an animal therebetween. Suitable means not shown may be provided for latching the lever 47 in a lowered position, and which constitutes no part of the present invention. It will also be apparent that either side 26 or 27 could be provided with the rigid bars 36a so that the lever 47 could extend outwardly from either side of the chute 10.

The squeeze chute 10 is provided at its forward end with a pair of neck yokes 51 of conventional construction except that each of the neck yokes, only one of which is illustrated in Figure 2, has a pin or projection 52 projecting from the rounded lower end 53 thereof. The neck yokes 51 rock or fulcrum for lateral swinging movement on their rounded lower ends 53 which engage on the front plate 19 forwardly of the front frame portions 30 and the depending projections 52 thereof selectively engage in the openings 25 to vary the spacing between the neck yokes 51.

Assuming that an animal has entered the cattle chute between the sides 26 and 27 from the left-hand end thereof as illustrated in Figure 2 and has reached a position so that the neck yokes 51 may be swung toward one another in a conventional manner for engagement around the neck of the animal, thereafter the lever 47 is swung downwardly to swing the sides 26 and 27 toward one another and toward upright positions for squeezing the body of the animal therebetween and while the animal is standing on the floor or deck plate 21 between the sleeves 25. A tail gate, not shown, may also be lowered at the left-hand end of the chute 10, as seen in Figure 2. Any of the bars 36 of either of the sides 26 and/or 27 may then be unlatched and swung outwardly and downwardly to a dotted line position as illustrated in Figure 7 to afford ready access to any part of the animal including the under part of the body, the legs or hoofs, for performing any of the operations normally performed on cattle and with the chute providing a minimum of obstruction. At times, through fright, pain or from other causes an animal will collapse or lose consciousness while in a cattle chute and considerable difficulty is encountered in removing the animal and much delay is caused thereby. However, with the chute 10, when this occurs the neck yokes 51 may be opened and the sides 26 and 27 released to swing outwardly, after which all of the drop bars 36 of the side 27 may be swung outwardly and downwardly so that the animal may be readily removed from the chute through the frame 28 of the side 27.

As previously pointed out, the sides 26 and 27 as well as the neck yokes 51 are laterally adjustable toward and away from one another to accommodate either full grown cattle or young calves.

Various modifications and changes are contemplated and may obviously be resorted to, without departing from the spirit or scope of the invention as hereinafter defined by the appended claims.

I claim as my invention:

1. In a cattle squeeze chute, an elongated upright frame structure having open sides and ends and including a floor extending from end-to-end thereof, a pair of laterally spaced frame sides each extending substantially from end-to-end of the frame structure, said frame sides being mounted to fulcrum on the floor about substantially parallel axes disposed longitudinally of the frame structure for lateral swinging movement of said frame sides toward and away from one another, at least one of said frame sides including a substantially arch shaped frame and a plurality of longitudinally spaced drop bars extending substantially in the plane of said arch shaped frame, longitudinally extending means adjacent the floor swingably mounting the lower ends of said drop bars in the arch shaped frame, and means detachably latching the upper ends of the drop bars of said frame side individually to the upper portion of said arch shaped frame whereby the drop bars may be individually unlatched and swung outwardly and downwardly to open positions for partially or fully opening the arch shaped frame substantially from top to bottom thereof.

2. In a cattle squeeze chute as in claim 1, said means for swingably mounting the drop bars at their lower ends comprising a rigid journal member extending longitudinally of each arch shaped frame and secured at its ends to lower portions of the frame ends adjacent the floor, and sleeve members secured to the lower ends of said drop bars and disposed transversely thereof, said sleeve members being journalled on said journal member and being disposed immediately above and substantially in contact with the floor.

3. In a cattle squeeze chute as in claim 1, said latch means including a swingably mounted yoke individual to each drop bar for engaging around the upper end of said drop bar and having stop means limiting downward swinging movement and for supporting the yoke in a plane substantially normal to the plane of the frame side, and the upper ends of said drop bars being beveled to provide cam surfaces on inner sides thereof for engaging and displacing the yokes upwardly from their positions as supported by the stop means as the drop bars are swung upward toward closed positions whereby the drop bars are automatically latched in closed positions in the arch shaped frame.

References Cited in the file of this patent

UNITED STATES PATENTS

| | | |
|---|---|---|
| 2,139,710 | Yokum | Dec. 13, 1938 |
| 2,557,477 | Simon | June 19, 1951 |
| 2,642,840 | Hill et al. | June 23, 1953 |